Jan. 23, 1962  E. D. HOBSON  3,017,898
END FITTINGS FOR SUCTION PIPES
Filed June 4, 1957  2 Sheets-Sheet 1

INVENTOR
Eric D. Hobson
BY
Watson, Cole, Grindle & Watson
ATTORNEYS

Jan. 23, 1962  E. D. HOBSON  3,017,898
END FITTINGS FOR SUCTION PIPES
Filed June 4, 1957  2 Sheets-Sheet 2

INVENTOR
Eric D. Hobson
BY
Watson, Cole, Grindle & Watson
ATTORNEYS

United States Patent Office 3,017,898
Patented Jan. 23, 1962

3,017,898
END FITTINGS FOR SUCTION PIPES
Eric Dott Hobson, Shandon, Scotland, assignor to Yarrow and Company Limited, Glasgow, Scotland, and Andre Rubber Company Limited, Surbiton, England, jointly
Filed June 4, 1957, Ser. No. 663,482
Claims priority, application Great Britain June 15, 1956
2 Claims. (Cl. 137—590)

This invention relates to an end fitting for pipes adapted to be connected with a suction pump for drawing off liquid from a tank or the like.

In order to empty tanks of liquid to the lowest possible level it is necessary that the inlet of the suction pipe should be positioned as close to the floor of the tanks as practicable. If, however, as is usually the case, the floor of the tank is not perfectly rigid there is a danger that it may flex inwardly as the weight of liquid decreases as the tank is emptied or if the tank is subjected to externally applied pressure. In this case if the liquid entry of the suction pipe is very close to the floor of the tank there is a danger that the inward flexing floor will cause it to be bowed inwardly and engage and close over the liquid entry.

It is an object of the present invention to provide an improved end fitting for a suction pipe which will obviate this drawback.

According to the present invention a tank adapted to contain liquid and having a floor subject to inward flexing movement is provided with a suction pipe extending inwardly of the tank and having its inlet end disposed adjacent to but in spaced relation to the said floor, an end fitting being attached to the inlet end of the pipe and including a neck portion and a hollow body depending from the neck, the pipe extending through the neck and being clamped thereto and the inlet end of the pipe being disposed within the said hollow body, said hollow body terminating in a lower open end having a cross sectional area substantially greater than that of the inlet of the pipe, and means being provided for locating said lower open end in predetermined spaced relation to the floor of the tank, at least part of the wall of the hollow body being made of flexible material such that any inward flexing of the tank floor will result in a contraction or expansion of said flexible part of the wall without disturbing the position of the lower open end of the body relative to the floor.

If desired the whole of the hollow body may be made of flexible or elastomeric material.

To enable the invention to be fully understood it will now be described with reference to the accompanying drawings, in which.

Figure 1:
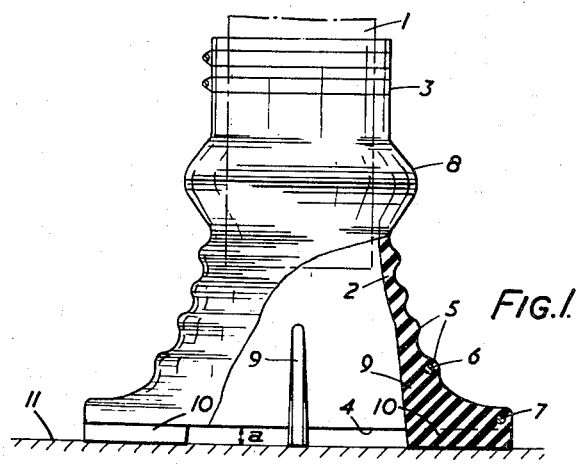
FIG. 1 is a side view partly in section of an end fitting for a suction pipe according to one embodiment of the invention.

As shown in FIG. 1 of the accompanying drawings a flexible end fitting for a suction pipe 1 is formed of elastomeric material, for example, neoprene and includes a hollow body portion 2 formed by a continuous peripheral wall and an integral neck 3 which embraces and is clamped to the inlet end of the pipe 1 by suitable means. As shown the hollow body is of generally conical shape the neck extending from the apex of the body 2.

The body 2 is flared outwardly and terminates in an open lower end 4 having a cross sectional area substantially greater than that of the inlet end of the pipe 1. The lower portion of the wall of the body may have a series of annular ribs 5, one or more of which may have stiffening rods 6 embedded therein. Preferably a stiffening rod such as 7 is embedded in the flange which constitutes the edge of the opening 4.

The upper portion of the hollow body below the neck 3 is formed with a flexible convolution or bulbous enlargement 8.

The hollow body is also formed with a series of integral web like portions which include a vertical portion 9 and a horizontal portion 10 extending under the peripheral edge of the lower open end 4 to form feet or spacer members which are adapted to rest on the floor of a tank to maintain the open end 4 of the hollow body in predetermined spaced relation to the tank floor 11.

It will be understood that the end fitting is primarily used in tanks having a floor which is subject to inward flexing. The convolution 8 is readily flexible and accordingly can expand or contract to accommodate any movement resulting from inward flexing of the tank floor 11. The position of the lower open end 4 of the end fitting will not, however, be altered but will be maintained in predetermined spaced relation to the floor to provide a fixed gap $a$ for the flow of liquid to be drawn from the tank through the hollow end fitting and up the suction pipe.

It will be noted that only part of the hollow body, namely the convoluted portion 8 is flexible. As shown this is an integral part of the end fitting but if desired the flexible portion could be separately formed and suitably connected to the neck 3 and a hollow body portion terminating in the open end 4.

Heretofore if the liquid entry for a suction pipe were disposed very close to the floor of the tank there would be a considerable risk that inward flexing of the floor would abut, close the open end of the suction pipe thereby preventing withdrawal of the liquid and exerting an undesirable straining force upon the rigid suction pipe. It will be noted, however, that the end fitting has a readily flexible wall portion which can expand and contract to accommodate any movement resulting from the inward flexing of the floor of the tank, and accordingly the dimensions of the gap $a$ will remain constant under all conditions.

Figure 2:
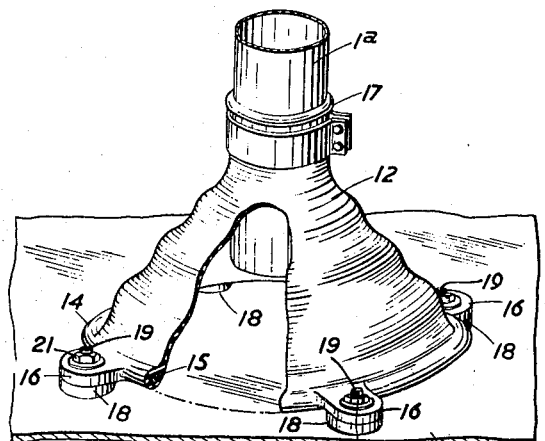
FIG. 2 is a side view partly in section of a modified form of the invention.

According to the modification shown in FIG. 2 the end fitting comprises a conically shaped body formed by a continuous flexible wall 12 of elastomeric material having peripherally disposed corrugations.

The lower open end 13 of the body has a thickened rim 14 in which is embedded a reinforcing wire 15, and integral lugs 16 project outwardly at circumferentially spaced intervals.

At the apex of the hollow body there is provided an integral neck 17 which is clamped to the suction pipe 1a.

In this embodiment, instead of the hollow body having integral feet, separate spacer pads 18 are provided positioned under the lugs 16. Studs 19 secured to the floor 11a of the tank extend upwardly through holes in the pads 18 and lugs 16. Nuts 21 are secured onto the studs to clamp the hollow body to the pads so that the lower open end is maintained in predetermined spaced relation to the floor 11a. As the wall 12 is flexible as a whole it can readily expand or contract and change its shape to accommodate any movement resulting from the inward flexing movement of the floor of the tank.

Figure 3:
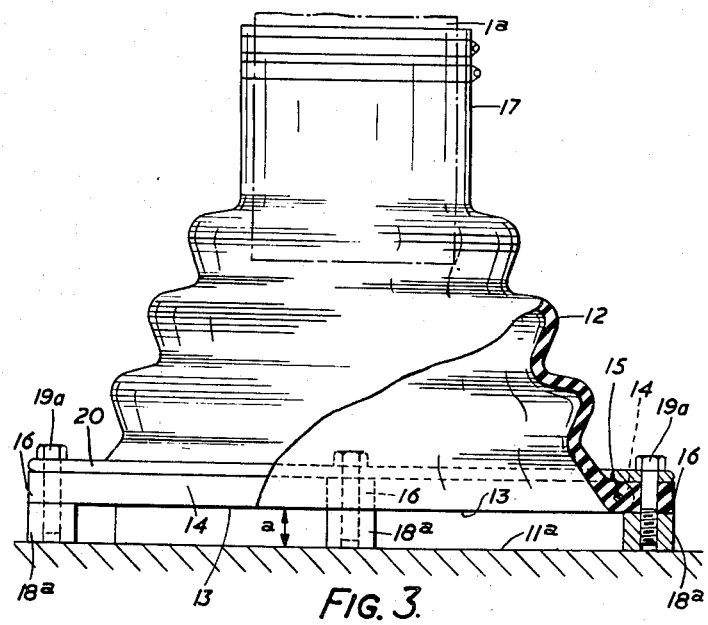
FIG. 3 is a side view partly in section of a further modification.

The embodiment according to FIG. 3 is substantially similar to that shown in FIG. 2 and like references are used to indicate like parts. The flexible wall 12, however, has more pronounced corrugations and the method of clamping the lower open end 13 of the hollow body is varied. As shown an annular clamping plate 20 encircles the rim 14 of the body and is positioned over the said rim and the lugs 16 which rest on spacer pads 18a. The pads 18a are integral with the floor 11a of the tank and the clamping plate 20 is secured by studs 19a extending through the holes in the plate and the lugs 16 and screwing into tapped holes in the pads 18a.

Figure 4:
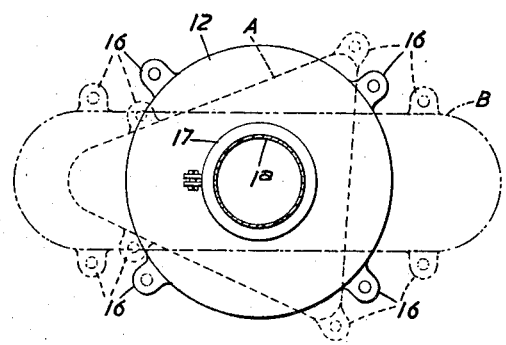
FIG. 4 is a plan view, diagrammatically illustrating the different shapes into which the flexible end fitting of the modified form shown in FIG. 3 may be arranged.

While the lower open end of the hollow body will usually be circular in cross section it may have any other desired shape and if desired an end fitting such as illustrated in FIG. 2 may be so adapted as to be deformable to provide a lower open end of various cross sectional shapes. For example, if the reinforcing rod 15 (FIG. 2) is made of easily bendable metal, it can be bent to form a lower open end having the triangular shape A, or the rectangular or elliptical shape B indicated in FIG. 4. The triangular shape is advantageous if the end fitting is to be mounted in a corner of a tank, while the rectangular or elliptical shape enables it to be mounted in restricted spaces such as between relatively closely spaced struts.

If the end fitting is given the shape A or B or other similar shape, a clamping plate such as 20 (FIG. 3) but of the appropriate shape, is provided and is clamped by studs to hold the lower open end of the hollow body in the desired new shape. It will be understood that the wall 12 of the hollow body will be sufficiently flexible to be deformable according to the altered shape of the lower open end.

The end fitting according to any one of the embodiments may be formed from natural or synthetic rubber such as neoprene or other suitable material which is flexible or elastic in its final moulded form.

The invention is particularly useful in connection with tanks used on ships which are normally filled with fuel oil and which when the oil has been used are filled with water for ballasting purposes, the ballast water being emptied when the tanks are to be refilled with fuel oil. In such cases it is important that the tank be emptied as dry as possible before being refilled with a different liquid as otherwise, in one case when refilled with ballast water the latter will be contaminated with any remaining oil residue and this will prevent it being freely discharged overboard as stringent Government restrictions exist against the discharge of oil contaminated water. In the second case when the tanks are refilled with oil after being deballasted the oil would be contaminated by any water left in the tank, which would mean that the whole contents of the tank would have to be treated for example by an oil/water centrifugal separator before the oil would be fit for use.

While it is essential that at least part of the body portion of the end fitting be made of material which is of a resilient or elastic nature to enable it to expand or contract or change its shape due to the inward flexing of the floor of the tank, the neck or other parts of the fitting can if desired be relatively rigid.

While the invention has been particularly described with reference to the emptying of tanks it may equally be used for enabling bilges to be completely emptied of liquid.

A further important advantage of the invention is that the flexible nature of the end fitting permits the suction pipe to be mounted at an angle to the axis which extends normal to the floor of the tank.

I claim:
1. In a tank adapted to contain liquid and having a floor subject to inward flexing movement, means for emptying the liquid therefrom comprising a suction pipe extending into the tank and having an inlet end directed towards the tank floor, an end fitting attached to the said inlet end of the pipe said end fitting comprising a hollow body having a flexible wall, the said body terminating in a lower open end having a cross sectional area substantially greater than that of the inlet end of the suction pipe, a peripheral flange extending outwardly of said lower end, a metal rod embedded in said flange, said rod being bendable to determine the cross-sectional shape of said lower end, and means for locating said lower open end of the body in predetermined spaced relation to the floor of the tank, such that any inward flexing of the tank floor will be taken up by flexing of said flexible part of the wall without disturbing the predetermined position of the lower open end of the body relative to the floor of the tank.

2. In a tank adapted to contain liquid and having a bottom wall area subject to upward flexing movement, conduit means for substantially completely evacuating liquid from the tank regardless of such normal flexure, said means comprising a substantially rigid suction pipe extending downwardly through the interior of the tank and directed substantially perpendicularly toward said bottom wall area, an inlet orifice forming member comprising a relatively inflexible annular part carried by said bottom wall area and means for fixedly securing the rim of said annular part at intervals around its periphery to said bottom wall area so that said rim is maintained at a predetermined short distance from the said wall area to provide relatively thin inlet orifices between said rim and said bottom wall area surface, the total cross-sectional area of said orifices being substantially greater than that of said suction pipe, such orifices providing means whereby substantially all of the available liquid may be withdrawn from the tank; said inlet orifice member further comprising a hollow flexible body portion extending from said fixed inlet part to the lower end of said rigid suction pipe and having a neck portion connected thereto, and at least one circumferentially extending corrugation in the wall of said flexible body portion, whereby any inward flexing of the bottom wall area will be taken up by the flexing of said flexible hollow body portion at said corrugations without disturbing the predetermined position of the lower open end relative to the floor of the tank, the means for fixedly securing the rim of the orifice member to the bottom wall of the tank comprising a flange integral with the said rim, circumferentially spaced pads interposed between said flange and the bottom wall area and secured to the latter, a clamping ring positioned over the flange, and means for securing said clamping ring to said pads.

References Cited in the file of this patent
UNITED STATES PATENTS

| | | |
|---|---|---|
| 659,669 | Haynes | Oct. 16, 1900 |
| 1,317,446 | Hollaender | Sept. 30, 1919 |
| 1,350,702 | Church | Aug. 24, 1920 |
| 1,625,699 | Benton | Apr. 19, 1927 |
| 1,716,544 | Felten | June 11, 1929 |
| 2,174,354 | Shields | Sept. 26, 1939 |
| 2,485,689 | Baumann | Oct. 25, 1949 |
| 2,617,440 | Stephens | Nov. 11, 1952 |
| 2,702,147 | Brown | Feb. 15, 1955 |
| 2,732,071 | Crow | Jan. 24, 1956 |
| 2,752,069 | Welsh | June 26, 1956 |
| 2,843,995 | Furstenberg | July 22, 1958 |